United States Patent [19]

Blunt et al.

[11] Patent Number: 4,911,402

[45] Date of Patent: Mar. 27, 1990

[54] MATERIAL HANDLING VALVE

[75] Inventors: William G. Blunt, Schoolcraft Township, Kalamazoo County; Eugene C. McGlashen, Lawrence Township, Van Buren County, both of Mich.

[73] Assignee: Harborlite Corp., Vicksburg, Mich.

[21] Appl. No.: 307,839

[22] Filed: Feb. 7, 1989

[51] Int. Cl.⁴ .............................. F16K 31/16
[52] U.S. Cl. .................... 251/78; 251/58; 251/229; 251/298
[58] Field of Search ............. 251/58, 77, 78, 80, 251/228, 298, 299, 229

[56] References Cited

U.S. PATENT DOCUMENTS

| 736,820 | 8/1903 | Collis | 251/58 |
|---|---|---|---|
| 1,147,242 | 7/1915 | Hentschel et al. | 251/228 |
| 2,244,698 | 6/1941 | Hinsch | 251/78 |
| 2,339,378 | 1/1944 | Clench et al. | 251/78 |
| 3,245,217 | 4/1966 | Hook et al. | 251/58 |
| 3,727,880 | 4/1973 | Stock | 251/85 |
| 3,747,617 | 7/1973 | Katchka | 251/78 |
| 3,857,545 | 12/1974 | Santi | 251/229 |
| 3,944,135 | 3/1976 | Kalinovski | 251/78 |
| 4,017,221 | 4/1977 | Dezelan | 251/78 |
| 4,158,367 | 6/1979 | Mailliet | 251/78 |
| 4,266,538 | 5/1981 | Ruchti | 251/58 |
| 4,573,661 | 3/1986 | Chapman | 251/58 |
| 4,706,933 | 11/1987 | Sukup | 251/58 |

Primary Examiner—George L. Walton
Attorney, Agent, or Firm—Flynn, Thiel, Boutell & Tanis

[57] ABSTRACT

A material handling valve includes a housing having a vertical passageway therethrough and a seating surface extending around the lower end of the passageway. A support arm within the passageway has one end supported on the housing for pivotal movement about a horizontal first axis and has a tipping part at its opposite end. A valve member disposed below the housing is pivotally supported on the support arm. The valve member has on an upper side thereof a sheet of resilient material, and pivotal movement of the support arm moves it between positions in which the resilient sheet is respectively engaging and spaced from the seating surface to respectively obstruct and permit material flow. An actuating arm is pivotally supported about a second axis parallel to the first axis near an upper end of the housing, and a linkage arrangement operatively couples the actuating arm and support arm so that movement of the actuating arm effects pivotal movement of the support arm and valve member. The actuating arm can move to a position in which a spring in the linkage arrangement resiliently yieldably urges the valve member against the seating surface on the housing.

14 Claims, 4 Drawing Sheets

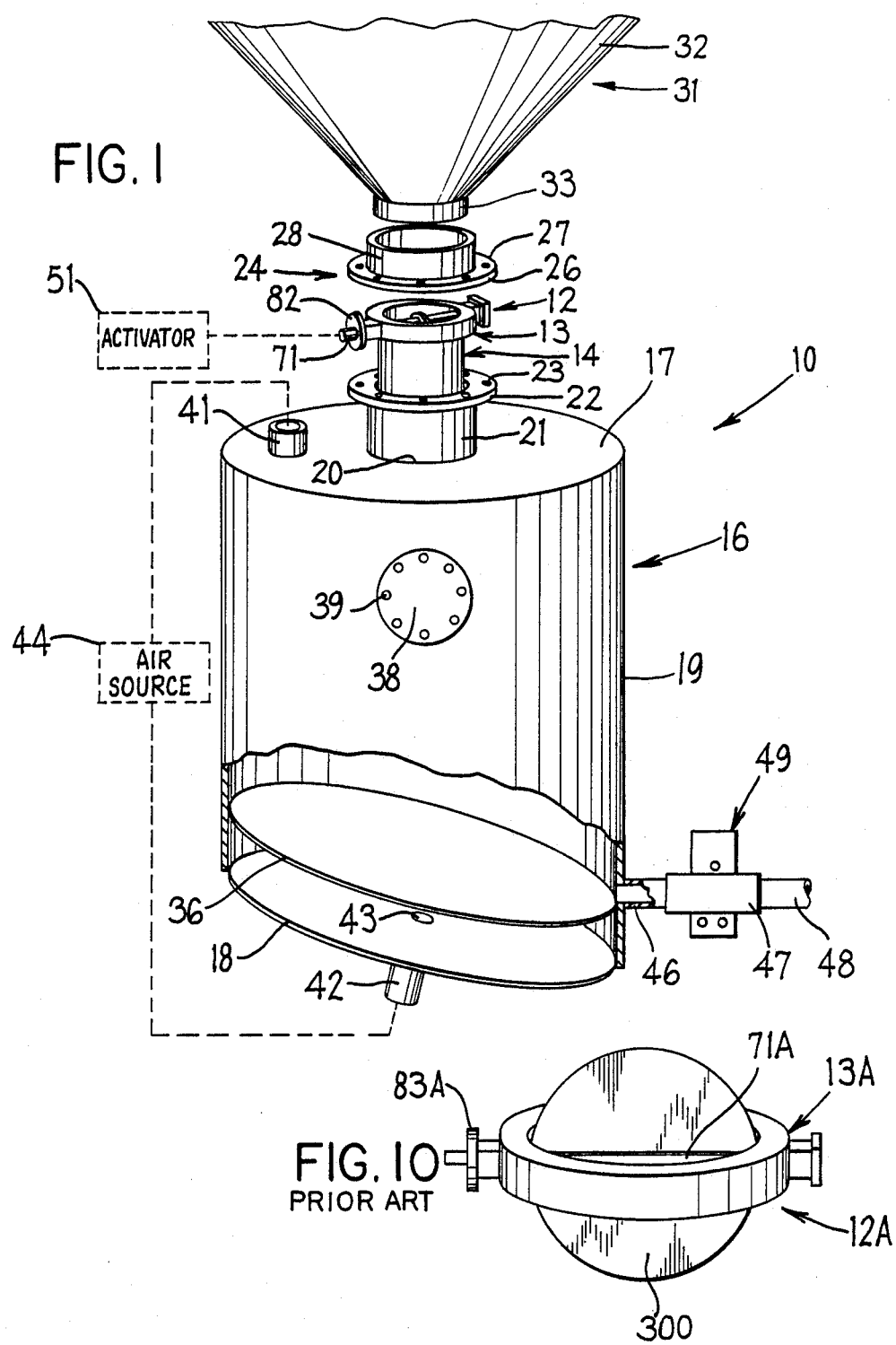

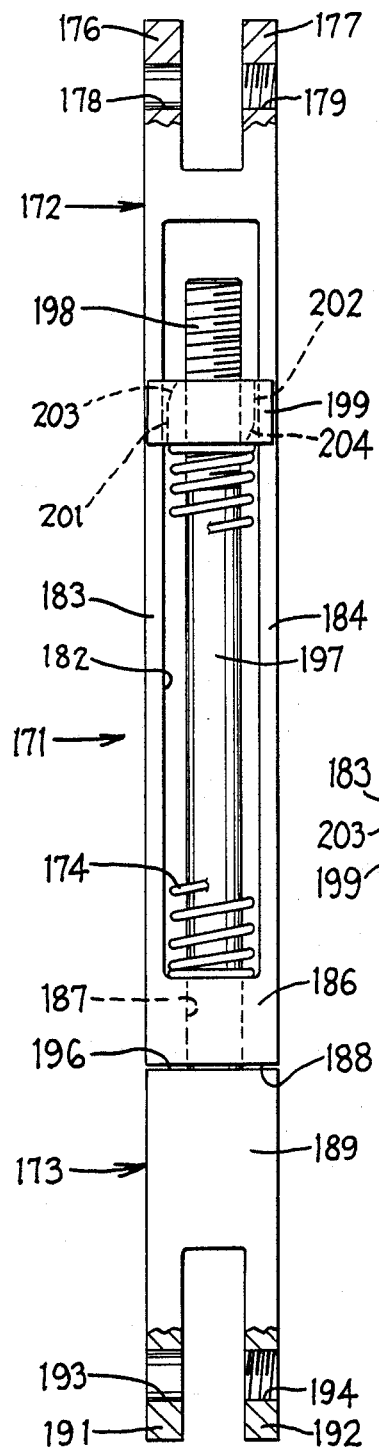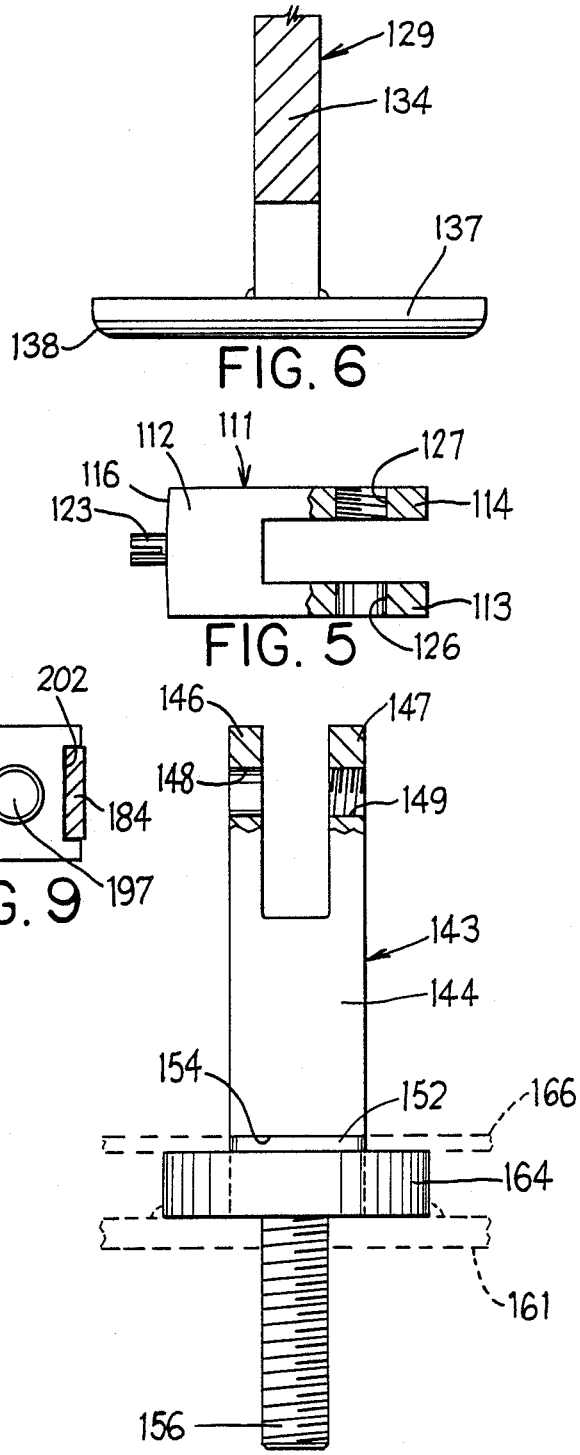

4,911,402

MATERIAL HANDLING VALVE

FIELD OF THE INVENTION

The present invention relates to a material handling valve and, more particularly, to a valve suitable for use in systems for pneumatically conveying dry bulk solids such as powder or pellets.

BACKGROUND OF THE INVENTION

In a conventional system for pneumatically conveying dry bulk solids such as plastic pellets or a powder, a butterfly-type valve such as that shown in FIG. 10 of the present application has previously been used. While systems utilizing this conventional type of valve have been adequate for their intended purposes, they have not been satisfactory in all respects.

In particular, due in part to frictional engagement between various parts of the valve, the valve tends to wear very quickly and rapidly loses its ability to produce an acceptable level of airtight seal. Obviously, a dependable seal which is substantially airtight is essential to efficient operation of a pneumatic conveying system. In practice, it has been found that, when a conventional butterfly-type valve of the type shown in FIG. 10 is utilized in a system for pneumatically conveying dry bulk solids such as plastic pellets or a powder, it is necessary to repair or replace either the valve itself or certain relatively expensive components thereof at relatively frequent intervals of only about three weeks under normal industrial use. Further, the structure of the conventional valve is such that, even where only repairs are needed, it is often necessary to disassemble the system sufficiently to permit removal of the valve in order to facilitate the repairs, which obviously can involve significant time and effort.

It is thus an object of the present invention to provide a valve which can be used in a system for pneumatically conveying dry bulk solids and which will require little or no maintenance.

A further object is to provide such a valve which will reliably provide an effective airtight seal each time it closes with minimal degradation over long periods of use.

A further object is to provide such a valve in which components requiring occasional maintenance can be repaired or replaced without necessarily disassembling part of the overall system and removing the valve from the system.

SUMMARY OF THE INVENTION

The objects and purposes of the invention, including those set forth above, are met according to a first form of the present invention by providing a valve which includes: a housing having a passageway through which a material can move; a valve member supported for movement relative to the housing between open and closed positions respectively permitting and obstructing material movement through the passageway; an actuating part supported for movement between first and second positions; and a linkage arrangement responsive to movement of the actuating part from its first position toward its second position for moving the valve member from its open position to its closed position, the linkage arrangement including a resilient arrangement which yieldably resiliently resists movement of the valve member away from its closed position when the actuating part is in its second position.

According to another form of the present invention, a valve includes: a housing having a passageway therethrough; a support arm pivotally supported for movement about a first axis between first and second positions; a valve member supported on the support arm for pivotal movement independently thereof about a second axis spaced from and approximately parallel to the first axis, the valve member being in a given pivotal position with respect to the support arm when the valve member is in its closed position; and an arrangement provided on the support arm for limiting pivotal movement of the valve member about the second axis away from its given position as the support arm pivots from its first position to its second position.

According to another form of the present invention, a valve includes: a housing having a passageway therethrough and having thereon a seating surface which extends around the passageway and faces in one direction, a valve member, and an arrangement supporting the valve member for movement between an open position and a closed position, the valve member having on one side thereof a surface which faces the seating surface and which engages the seating surface along the entire length thereof when the valve member is in its closed position, the arrangement supporting the valve member including a movably supported support member having a portion which extends through an opening in the valve member and has threads thereon, and includes a nut which cooperates with the threads on the portion of the support member and fixedly releasably secures the valve member to the support member.

BRIEF DESCRIPTION OF THE DRAWINGS

A preferred embodiment of the invention will be described in detail hereinafter with reference to the accompanying drawings, in which:

FIG. 1 is a partially exploded, fragmentary perspective view of a pneumatic material handling system embodying the inventive material handling valve;

FIG. 5 is a fragmentary top view of a support bracket which is a component of the inventive valve;

FIG. 6 is a sectional view taken along the line VI—VI in FIG. 3;

FIG. 7 is a sectional view of a disk link and alignment collar taken along the line VII—VII in FIG. 3;

FIG. 8 is a sectional view taken along the line VIII—VIII in FIG. 3;

FIG. 9 is a sectional view taken along the line IX—IX in FIG. 3; and

FIG. 10 is a perspective view of a conventional material handling valve which was previously utilized in the system of FIG. 1.

Figure 4:
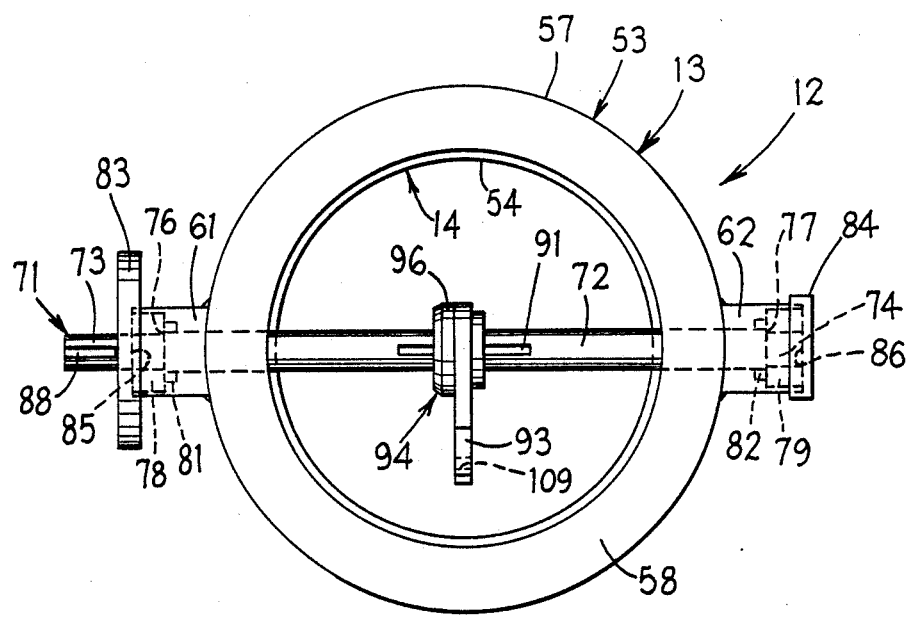
FIG. 4 is a top view of the valve of FIG. 2, with some internal linkage components omitted for clarity.

Certain terminology will be used in the following description for convenience in reference only, and is not to be considered limiting. The words "up", "down", "right" and "left" will designate directions in the drawings to which reference is made. The words "in" and "out" will refer to directions respectively toward and away from the geometric center of the inventive valve and designated parts thereof. Such terminology will include the words specifically mentioned, derivatives thereof, and words of similar import.

DETAILED DESCRIPTION

FIG. 1 depicts in partly exploded form a pneumatic material handling system 10. This system is used to handle dry bulk solids (such as powders or plastic pellets) which can be fluidized by the application thereto of pressurized air. The system includes a material handling valve 12 which embodies the present invention and is described in detail later. For the moment, is it sufficient to point out that the valve has an annular collar portion 13 at the upper end thereof, and a cylindrical body portion 14 which projects downwardly from the collar portion 13 and which has an outer diameter less than that of the collar portion 13.

The system 10 includes a container or tank 16 having a circular top wall 17, an inclined elliptical bottom wall 18, and a cylindrical side wall 19 which extends between and is welded to the peripheral edges of the top wall 17 and bottom wall 18. The top wall 17 has in the center thereof a circular opening 20, and a cylindrical tube 21 with an outside diameter substantially equal to the diameter of the opening 20 has its lower end disposed in the opening 20 and welded to the top wall 17. An annular flange 22 is secured to and projects radially outwardly from the upper end of the cylindrical tube 21, and has therethrough a plurality of vertically extending openings 23 which are uniformly angularly spaced. The inside diameter of the tube 21 is larger than the outside diameter of the body portion 14 of valve 13 but smaller than the outside diameter of collar portion 13 of valve 12, so that the body portion 14 of valve 12 can be slid into the tube 21 during assembly until the collar portion 13 rests on the upper surface of the flange 22.

A coupling part 24 has an annular flange 26 which is secured to and projects radially outwardly from the lower end of a cylindrical sleeve 28, which has a plurality of vertical openings 27 provided therethrough at uniformly angularly spaced locations, and which engages the upper side of the collar portion 13 of valve 12. A plurality of conventional and not-illustrated bolts extend through the aligned openings 27 and 23, and nuts on these bolts securely clamp the collar portion 13 of the valve 12 between the flanges 22 and 26. The outside diameter of the collar portion 13 is such that each bolt is located a small distance radially outwardly of the outer peripheral edge of the collar 13.

A material supply bin 31 is located above the tank 16 and has a downwardly converging frustoconical portion 32 which terminates in a cylindrical sleeve 33. The outside diameter of sleeve 33 is approximately equal to the inside diameter of sleeve 28, and sleeve 33 is slidably received within the sleeve 28. After the sleeve 33 is inserted into sleeve 28, tape is preferably wrapped around the outside of sleeves 28 and 33 to seal the slip joint between them, although in situations where the fit between them is relatively close, it is not absolutely necessary to wrap them.

An elliptical membrane 36 made of a heavy canvas material is disposed within the tank 16 parallel to and a small distance above the bottom wall 19, and has its peripheral edges sealingly secured to the cylindrical side wall 19 in a conventional and not-illustrated manner, so as to divide the chamber within tank 16 into upper and lower portions. A removable hatch 38 is provided in the cylindrical side wall 19, and is secured in place with a plurality of screws 39.

A conduit 41 is sealingly secured in an off-center opening in the top wall 17, and a conduit 42 is sealingly secured in a center opening 43 in the bottom wall 18, the conduits 41 and 42 each communicating with the chamber defined within the tank 16 on respective sides of the membrane 36. An air source 43 can selectively supply air at a low pressure through the conduits 41 and 42.

A further conduit 46 is sealingly secured in an opening provided through the side wall 19 just above the vertically lowest edge portion of the membrane 36. The conduit 46 is connected through a flexible hose segment 47 to a further conduit 48, and a pneumatic pinch mechanism 49 is provided and, when pneumatically actuated, pinches the flexible hose segment 47 so as to obstruct material flow from conduit 46 into conduit 48.

An activator 51 is provided to selectively open and close the valve 12 in a manner described in detail hereinafter.

Figure 2:
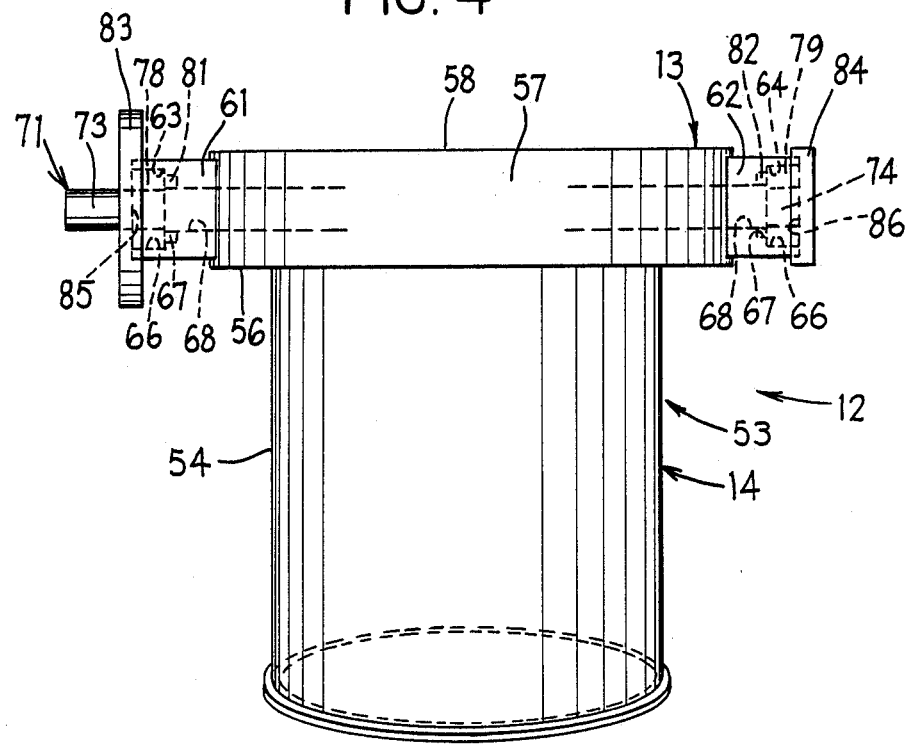
FIG. 2 is an elevational front view of the inventive material handling valve.
Figure 3:
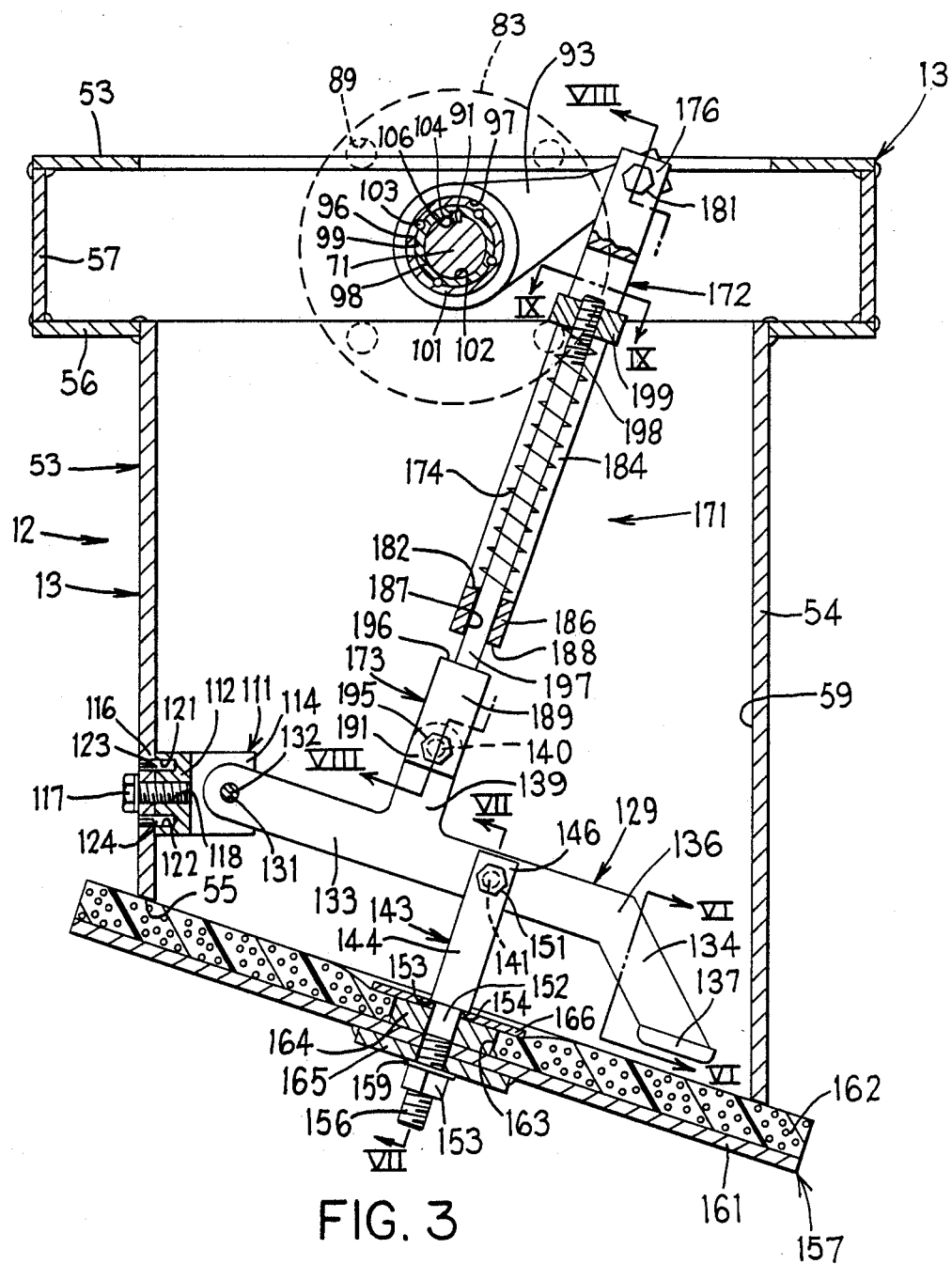
FIG. 3 is a sectional side view of the material handling valve of FIG. 2.

More specifically, with reference to FIGS. 2–4, the valve 12 which embodies the invention has a housing 53 which includes a vertically extending tube 54 of cylindrical cross-section having a lower end 55 cut at an acute angle of 18° to a horizontal reference, which includes an annular lower collar plate 56 welded to and extending radially outwardly from the upper end of the tube 54, which includes a cylindrical tubular collar sleeve 57 welded to and extending upwardly from the radially outer end of the lower collar plate 56, and which includes an annular upper collar plate 58 welded to and extending radially, inwardly from the upper end of the sleeve 57. The length of the tube 54 is sufficient so that the lower end 55 thereof is disposed somewhat below the top wall 17 of tank 16. The collar sleeve 57 and plates 56 and 58 define the annular collar portion 13 mentioned previously, and the tube 54 defines the cylindrical body portion 14 mentioned previously. The housing 53 has a passageway 59 extending vertically through it, the lower end 55 of the housing encircling the passageway and serving as a seating surface.

Referring to FIGS. 2 and 4, two bearing blocks 61 and 62 of square cross section are fixedly welded to and project radially outwardly from diametrically opposite sides of the collar sleeve 57. The bearing blocks 61 and 62 have respective stepped recesses 63 and 64 of circular cross-section extending thereinto from radially outer ends thereof. As shown in FIG. 2, each of the recesses 63 and 64 includes at the inner end thereof a cylindrical seal receiving portion 67 and, between the portion 67 and the outer end of the bearing block, a cylindrical bearing receiving portion 66 having a diameter larger than the diameter of the seal receiving portion 67. Each block 61 and 62 also has a cylindrical bore 68 which extends from the inner end of the recess 63 or 64 radially inwardly to the radially inner end of the block 61 or 62, and the collar sleeve 57 has two circular openings therethrough which are each aligned with and have a diameter greater than or equal to a respective one of the bores 68 in the bearing blocks 61 and 62.

Referring to FIG. 4, a cylindrical shaft 71 has a center portion 72 and has end portions 73 and 74 with diameters less than the diameter of the center portion 72, so that axially outwardly facing annular shoulders 76 and 77 are defined between the end portions 73 and 74 and the center portion 72. The shaft 71 extends through the bore 68 in each of the bearing blocks 61 and 62, and of course through the openings provided in the sleeve 57 in alignment therewith. Conventional ball bearings 78 and 79 are each provided on a respective end portion 3 or 74 of the shaft 71 in engagement with a respective one of the shoulders 76 or 77 thereon, and are each received in the bearing receiving portion 66 of a respective one of the recesses 63 or 64, to thereby rotatably support the shaft 71. Two conventional annular seals 81 and 82 are each provided around the center portion 72 of the shaft 71 adjacent a respective one of the shoulders 76 and 77, and the seals 81 and 82 are each disposed in the seal receiving portion 67 of a respective one of the recesses 63 and 64.

A circular bearing retaining plate 83 and a square bearing retaining plate 84 each have a respective shallow square recess 85 or 86 therein which receives the radially outer end of a respective one of the bearing blocks 61 and 62, and each of the plates 83 and 84 is fixedly secured to the associated bearing block by four not-illustrated bolts which extend through the plate parallel to the shaft 71 and engage threaded openings provided in the associated bearing block. The bearing blocks 83 and 84 thus retain the bearings 78 and 79 and the seals 81 and 82 in position, the bearings 78 and 79 in turn cooperating with the shoulders 76 and 77 on shaft 71 to prevent axial movement of shaft 71. The end portion 73 of shaft 71 extends through a central opening provided in the bearing plate 83, and has a keyway 88 provided at its outer end. As shown in broken lines in FIG. 3, the plate 83 has a plurality of angularly spaced openings 89 therethrough. The activator 51 shown in FIG. 1 is fixedly bolted to the plate 83 using the openings 89 therein, and has a movable part (not illustrated) which encircles and is keyed to the shaft end portion 73 having the keyway 88, so that the activator can effect rotational movement of shaft 71.

The shaft 71 also has a keyway 91 in its center portion 72. An actuating arm 93 is supported on the shaft 71 and projects radially outwardly therefrom. The actuating arm 93 is fixedly clamped to the shaft 71 by a taperlock bushing 94 (FIG. 4). The taperlock bushing 94 is conventional, but described here briefly to facilitate an understanding of the present invention. It includes, as shown in FIG. 3, a hub portion 96 which is welded in an opening 97 provided through the radially inner end of the arm 93, and has a colletlike bushing portion 99 which is disposed in a frustoconical opening 98 through the center of the hub portion 96. The bushing portion 99 has a frustoconical outer surface 101 which engages the frustoconical surface 98 of hub 96, and has a cylindrical central opening 102 which receives and is of approximately the same diameter as the shaft 71. Rotatable screw studs 103 cooperate with the hub portion 96 and bushing portion 99 so as to effect relative axial movement thereof which, due to the frustoconical surfaces 98 and 101, causes the bushing portion 99 to progressively more tightly grip the shaft 71 so that the arm 93 is held against rotational or axial movement relative to the shaft 71.

In order to fixedly prevent relative rotation of the bushing portion 99 relative to shaft 71, a keyway, 104 is provided in bushing portion 99 and a key 106 is provided in aligned keyways 91 and 104.

The radially outer end of the arm 93 has an opening 109 extending therethrough parallel to the shaft 71.

Referring to FIGS. 3 and 5, a support bracket 111 is approximately U-shaped, and has a bight 112 and spaced parallel legs 113 and 114 projecting outwardly from opposite ends of the bight 112. A surface 116 on the bight 112 is disposed against the inner surface of the cylindrical tube 54 and, as shown in FIG. 5, has a curvature which conforms to the curvature of the tube 54. The bracket 111 is secured to the tube 54 by a screw 117 which extends through a hole provided in the tube 54 and which engages a threaded hole 118 provided in the bight 112 of bracket 111. The bight 112 has holes 121 and 122 respectively provided above and below the threaded hole 118, and split pins 123 and 124 each have a solid end disposed in a respective one of the holes 121 and 122 and have a split end which is disposed in a respective hole provided in the tube 54. The split pins 123 and 124 prevent rotation of the bracket 111 with respect to tube 54.

Aligned holes 126 and 127 are provided in the legs 113 and 114, the hole 127 being threaded.

Referring to FIG. 3, a support arm 129 has a hole 131 at one end, and is pivotally supported on the bracket 111 by a bolt 132 which extends through the hole 126 in bracket 111 and the hole 131 in support arm 129, and threadedly engages hole 127 in bracket 111. The support arm 129 has a portion 133 which extends approximately radially outwardly from the bolt 131, and has at the outer end 136 thereof a portion 134 which extends downwardly so as to form an obtuse angle with respect to the portion 133. With reference to FIGS. 3 and 6, the portion 134 has welded to its lower end a horizontally extending tipping plate 137. The lower edges of the tipping plate 137 are all beveled as shown at 138, so that the underside of the tipping plate 137 has no sharp corners. Approximately halfway along the portion 133 of arm 129, arm 129 has an upwardly projecting portion 139 which has through its upper end a hole 140. The arm 129 also has a hole 141 therethrough at a location about halfway between the upwardly projecting portion 139 and the outer end 136 of portion 133.

A valve member support post 143 has an upper half 144 which has an approximately rectangular cross-section and which has at its upper end two spaced, upwardly projecting legs 146 and 147 having respective holes 148 and 149 therein, the hole 149 being threaded. The support arm 129 extends between the legs 146 and 147 of support post 143, and support post 143 is pivotally supported on support arm 129 by a bolt 151 which extends through holes 148 and 141 and threadedly engages hole 149. The support post 143 has a keying projection 152 of rectangular cross-section projecting downwardly from the lower end of upper half 144 thereof, the width of the keying projection 152 being less than the width of the upper half 144 so as to define two downwardly facing shoulders 153 and 154 at the top of the keying projection 152 and on opposite sides thereof. The support post 143 also has a threaded cylindrical stud 156 projecting downwardly from the bottom of the keying projection 152. The keying projection 152 and stud 156 extend through a valve member 157 which is an elliptical disk, and the valve member 157 is removably secured on the support post 143 by a washer 159 and nut 58.

Referring to FIG. 3, the valve member 157 includes an elliptical metal base plate 161 having on the upper side thereof an elliptical sheet 162 of silicone foam rubber. The foam rubber sheet 162 has in the center thereof a circular opening 163, and a circular alignment collar 164 with an outside diameter equal to the diameter of opening 163 is disposed in the opening 163 and welded to the upper side of the metal plate 161. The axial thickness of collar 164 is less than that of sheet 162. A circular reinforcing plate 165 is welded to the underside of the metal plate 161 in the center thereof. A compression washer 166 having a diameter greater than the diameter of collar 164 is disposed against the upper surface of the collar 164, but is not secured thereto. The washer 166 and alignment collar 164 have rectangular central openings which are congruent in size and shape with and which receive the rectangular keying projection 152 of support post 143, the shoulders 153 and 154 of post 143 engaging the washer 166 to prevent upward movement thereof. The base plate 161 and reinforcing plate 165 each have through the center thereof a circular opening which is equal in diameter to and receives the upper end of the cylindrical stud 156. The rectangular shape of the keying projection 152 prevents rotation of the collar 164 and, since the collar 164 is welded to base plate 161, prevents rotation of elliptical base plate 161. Due to the fact that the thickness of alignment collar 164 is less than the thickness of the foam rubber sheet 162, tightening of the nut 158 causes the radially inner portion of the sheet 162 to be compressed somewhat between the base plate 161 and compression washer 166.

The actuating arm 93 is operatively drivingly coupled to the support arm 129 by a vertically extending linkage assembly 171 which is oriented generally transversely to arms 93 and 129 and which includes an upper linkage bracket 172, a lower linkage bracket 173, and a helical compression spring 174 which yieldably urges the lower linkage bracket 173 upwardly relative to the upper linkage bracket 172.

More specifically, the upper linkage bracket 172 has at its upper end two upwardly projecting legs 176 and 177 which have respective holes 178 and 179 therethrough, the hole 179 being threaded. The radially outer end of the actuating arm 93 is disposed between the legs 176 and 177, and the upper linkage bracket 172 is pivotally supported on the arm 93 by a bolt 181 which extends through the holes 178 and 179 and threadedly engages the hole 179. The upper linkage bracket 172 has therein a slotlike opening 182 which extends lengthwise thereof and opens therethrough in a transverse direction. The opening 182 thus defines spaced, parallel side wall portions 183 and 184 of the bracket 172. The lower end portion 186 of the bracket 172 has therein a cylindrical hole 187 which extends downwardly from the lower end of slotlike opening 182 and opens through a downwardly facing surface 188 provided on the bottom of upper linkage bracket 172.

The lower linkage bracket 173 has a body 189 and, projecting downwardly from body 189, two spaced, parallel legs 191 and 192 which have therein respective holes 193 and 194, the hole 194 being threaded. The upper projection 139 on support arm 129 is disposed between the legs 191 and 192, and lower linkage bracket 173 is pivotally coupled to the support arm 129 by a bolt 195 which extends through the holes 193 and 140 and threadedly engages hole 194. An upwardly facing surface 196 is provided on top of the body 189, and the bracket 173 has a cylindrical rod 197 which projects upwardly from the surface 196 and has threads 198 at its upper end. A square spring abutment nut 199 is provided on the threads 198 of the rod 197, and can slide within the slotlike opening 182 lengthwise thereof. The helical compression spring 174 encircles the rod 197 and has its ends respectively disposed against the nut 199 and a surface on the lower end portion 186 of bracket 172. As shown in FIG. 9, the nut 199 has on opposite sides thereof respective shallow wide grooves 201 and 202 of rectangular cross-section which each slidably receive a respective one of the side wall portions 183 and 184 of the upper bracket 172, the cooperation between the grooves 201 and 202 and the wall portions 183 and 184 preventing rotation of the nut 199 relative to the upper linkage bracket 172. The nut 199 has at a respective end of each of the grooves 201 and 202 a respective bevel 203 or 204 (FIG. 8). The bevels are essentially coaxial cylindrical surface portions of equal diameter, such diameter being less than the distance between wall portions 183 and 184. The axial thickness of nut 199 is less than its width, and is less than the distance between wall portions 183 and 184. The bevels 203 and 204 thus facilitate assembly by permitting the nut 199 to be inserted between the wall portions 183 and 184 and to then be rotated 90° clockwise about an axis perpendicular to the plane of FIG. 8 to the position illustrated in FIG. 8. The tension of spring 174 is adjusted by rotating the upper bracket 172 relative to the lower bracket 173 about the axis of rod 197 before the linkage assembly 171 is operatively coupled to both of the arms 93 and 129 with bolts 181 and 151.

FIG. 10 illustrates an conventional butterfly-type valve 12A which was used in the system of 10 of FIG. 1 prior to development of the inventive valve 12. This valve has an annular collar portion 13A with an activator support plate 83A fixedly secured thereon, and a rotatable shaft 71A. These components correspond functionally and structurally with those in the valve 12 described above, and have therefore been designated with similar reference numerals. The valve member of valve 12A is a circular plate 300 which is fixedly secured to the shaft 71 and, as is conventional in butterfly-type valves, can be moved by rotation of the shaft between an open position shown in FIG. 10 in which material flow is permitted through the valve 12A and a closed position rotated 90° therefrom in which the valve member 300 obstructs material flow through the valve.

OPERATION

Referring to FIG. 1, the operation of the overall system 10 will first be briefly described. A not-illustrated conventional controller alternatively implements first and second modes of operation. In the first mode of operation, the air source 44 is deactuated so that it supplies no air to the tank 16, the mechanism 49 is actuated so that it pinches the hose section 47 and prevents material flow into the conduit 48, and the activator 51 is controlled so as to rotate shaft 71 in a manner which causes the valve 12 to open. Due to the force of gravity, material will flow from the supply bin 31 through the valve 12 into tank 16. Thereafter, the controller implements the second mode by causing the activator 51 to rotate shaft 71 so as to close the valve 12, by causing the air source 44 to supply air at a low pressure through conduits 41 and 42, and by deactuating pinch mechanism 49 so that the hose section 47 is not pinched and material can flow therethrough. The air entering the portion of the tank 16 below membrane 36 through conduit 42 flows upwardly through the canvas membrane 36 and, with the air supplied through conduit 42, tends to fluidize the material present along the membrane in the tank 16 and cause it to flow through the conduit 46 and hose section 47 into conduit 48. The valve 12 provides a low pressure seal which prevents the pressurized air supplied to tank 16 through conduits 41 and 42 from flowing upwardly into the supply bin 31.

After the tank 16 has been emptied, the controller again implements the first mode of operation to again fill the tank with material.

The specific opening and closing movements of the valve 12 will be described in detail with reference to FIG. 3. In FIG. 3, the valve member 157 is shown in a closed position in which it engages the seating surface 55 on the lower end of the housing 53 along the entire periphery of the surface 55 so as to prevent material from flowing downwardly through the valve 12. The positions of the shaft 71 and the actuating arm 93 thereon position the upper linkage bracket 172 with respect to the lower linkage bracket 173 so that the surfaces 188 and 196 thereon are spaced. Consequently, the spring 174 yieldably urges the lower linkage bracket 173 upwardly with respect to the upper linkage bracket 172, so that the support arm 129 is in turn urged to pivot counterclockwise about bolt 132 in FIG. 3 and thus yieldably urge the valve member 157 firmly against the surface 55 of the valve 12 along the entire periphery of the surface 55. Valve member 157 thus obstructs material flow through the passageway 59 in valve 12.

When the shaft 71 is thereafter rotated clockwise in FIG. 3 in order to open the valve 12, the arm 93 is pivoted clockwise and moves the upper linkage bracket 172 downwardly. The support arm 129 will not move until the arm 93 has rotated sufficiently far so that the surfaces 188 and 196 on brackets 172 and 173 engage each other. Then, as the arm 193 rotates further, the linkage assembly 171 will pivot the support arm 129 clockwise about bolt 132 away from the position shown in FIG. 3, which in turn will cause the valve member 157 to move downwardly and leftwardly away from the annular seating surface 55 of the housing 53 so that it is possible for material to flow through the passageway 59 in the valve 12. During this movement, the valve member 157 would have a tendency, due to force of gravity acting on the valve member 157 and acting on any material resting thereon, to pivot counterclockwise about the bolt 151. Although a small amount of such movement is possible, the tipping plate 137 then engages the valve member 157 to prevent further pivoting movement and thereby forces the right end of the valve member 157 in FIG. 3 downwardly and leftwardly until it is substantially out of the path of material flow through the valve 12.

When the valve is subsequently to be closed, the shaft 71 is rotated counterclockwise in FIG. 3 so that the actuating arm pivots counter clockwise. In response to this counter clockwise pivoting, the linkage assembly 171 pivots the arm 129 counterclockwise in FIG. 3 until the valve member 157 has moved back to the closed position shown in FIG. 3. After the valve member 157 reaches the closed position shown in FIG. 3, the shaft 71 and actuating arm 93 continue to pivot a small angular distance so that the upper linkage bracket 172 is moved upwardly relative to the lower linkage bracket and the surfaces 188 and 196 thereon are moved apart as shown in FIG. 3, whereby the spring 174 again yieldably urges the lower linkage bracket 173 upwardly so that the valve member 157 is yieldably urged upwardly against the surface 55 of the housing 53 in order to ensure that the foam rubber sheet 162 thereon sealingly engages the surface 55 of housing 53 at all points therealong.

In the event the foam rubber sheet 162 becomes worn after extended use, it can be replaced by removing the nut 158 and washer 159 in FIG. 3, sliding the entire valve member 157 off the post 143, lifting the compression washer 166 off the valve member 157, then lifting the foam rubber sheet 162 off the plate 161 and replacing it with an identical new foam rubber sheet, then replacing the washer 166, then sliding the entire valve member 157 back onto the post 153, and then replacing the washer 159 and nut 158. It is important to note that this procedure can be carried out through the access hatch 38 shown in FIG. 1 without any need to remove the entire valve 12 from the system 10, which of course would involve substantial time and effort for disassembly and reassembly.

The operation of the conventional butterfly valve shown in FIG. 10 is believed to be self-evident, and a detailed discussion thereof is thus believed unnecessary.

Although a preferred embodiment of the invention has been shown in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A valve comprising: a housing having therein a downwardly extending passageway through which a material can move, and having at a lower end of said passageway a seating surface which extends around said passageway and faces approximately downwardly; a valve member and means supporting said valve member for movement relative to said housing between open and closed positions respectively permitting and obstructing material movement through said passageway, said valve member having thereon an upwardly facing surface which respectively engages and is spaced from said seating surface in said open and closed positions, said means supporting said valve member including a support arm which is disposed substantially within said passageway when said valve member is in said closed position, and which has one end supported on said housing for pivotal movement about a substantially horizontal pivot axis, and including means supporting said valve member on said support arm at a location spaced from said pivot axis; an actuating part supported for movement relative to said housing from a first position through a second position to a third position; and linkage means responsive to movement of said actuating part from said first position to said second position for moving said valve member from said open position to said closed position, said linkage means including resilient means which is tensioned as said actuating part moves from said second position to said third position for yieldably resiliently resisting movement of said valve member away from said closed position when said actuating part is in said third position.

2. The valve of claim 1, wherein said linkage means includes first and second linkage members which are supported for relative movement and which are each operatively coupled to a respective one of said actuating part and said valve member, and wherein said resilient means includes a spring which is cooperable with said first and second linkage members for yieldably urging relative movement therebetween.

3. The valve of claim 2, wherein said first linkage member has therein a slotlike opening extending approximately parallel to a direction of relative movement of said first and second linkage members, has an end surface which is approximately perpendicular to said direction of relative movement, and has a hole extending from said end surface to said slotlike opening approximately parallel to said direction of relative movement; and wherein said second linkage member has a surface which faces said surface on said first linkage member and has elongate rod projecting outwardly from said surface thereon, said rod extending slidably through said hole in said first linkage member and into said opening in said first linkage member substantially parallel to said direction of relative movement, said second linkage member having a spring abutment supported on said rod within said opening, said spring being a helical compression spring which encircles said rod and which has one end supported on said spring abutment and its other end supported on a portion of said first linkage member at one end of said slotlike opening.

4. The valve of claim 1, wherein said valve member includes a resilient member which has thereon said surface which is engageable with said seating surface when said valve member is in its closed position.

5. The valve of claim 1, wherein said means supporting said valve member includes means pivotally supporting said valve member on said support arm.

6. The valve of claim 5, wherein said means pivotally supporting said valve member includes a support member pivotally supported on said support arm and having a portion which extends through an opening in said valve member and which has threads thereon, and includes a nut which cooperates with said threads on said portion of said support member and fixedly releasably secures said valve member to said support member.

7. The valve of claim 6, wherein said opening in said valve member includes a noncircular portion which receives and corresponds in size and shape with a noncircular portion of said support member, to thereby prevent rotation of said valve member relative to said support member.

8. The valve of claim 7, wherein said valve member includes: a base plate; a resilient sheet which is provided against said base plate on a side thereof nearest said seating surface, which has thereon said surface engageable with said seating surface, and which has a central circular opening; a circular alignment collar disposed in said opening in said sheet and fixedly secured to said base plate, said collar having a thickness less than the thickness of said sheet; and a compression washer which is disposed against a side of said collar remote from said base plate; said opening through said valve member extending through said base plate, collar, and washer.

9. The valve according to claim 5, wherein said housing includes a substantially cylindrical tubular portion which extends generally vertically and includes at the upper end of said tubular portion a radially outwardly projecting collar portion, said passageway extending through said tubular portion; including a substantially horizontal shaft having its ends rotatably supported on said collar portion at respective locations on opposite sides of said collar portion, said actuating part being fixedly supported on said shaft; and wherein said linkage means is coupled to said actuating part at a location spaced radially outwardly from said shaft.

10. The valve of claim 9, including taperlock bushing means for effecting said fixed support of said actuating part on said shaft.

11. The valve of claim 9, wherein a lower end of said tubular portion which has thereon said seating surface is inclined with respect to a central axis of said tubular portion.

12. A valve comprising: a housing having therein a passageway through which a material can move; a valve member and means supporting said valve member for movement relative to said housing between open and closed positions respectively permitting and obstructing material movement through said passageway; an actuating part supported for movement relative to said housing between first and second positions; and linkage means responsive to movement of said actuating part from said first position toward said second position for moving said valve member from said open position to said closed position, said linkage means including resilient means for yieldably resiliently resisting movement of said valve member away from said closed position when said actuating part is in said second position; wherein said linkage means includes first and second linkage members which are supported for relative movement and which are each operatively coupled to a respective one of said actuating part and said valve member; wherein said resilient means includes a spring which is cooperable with said first and second linkage members for yieldably urging relative movement therebetween; wherein said first linkage member has therein a slotlike opening extending approximately parallel to a direction of relative movement of said first and second linkage members, has an end surface which is approximately perpendicular to said direction of relative movement, and has a hole extending from said end surface to said slotlike opening approximately parallel to said direction of relative movement; wherein said second linkage member has a surface which faces said surface on said first linkage member and has an elongate rod projecting outwardly from said surface thereon, said rod extending slidably through said hole in said first linkage member and into said opening in said first linkage member substantially parallel to said direction of relative movement, said second linkage member having a spring abutment supported on said rod within said opening, said spring being a helical compression spring which encircles said rod and which has one end supported on said spring abutment and its other end supported on a portion of said first linkage member at one end of said slotlike opening; wherein said rod has threads thereon, and wherein said spring abutment is a nut threadedly engaging said threads on said rod, said slotlike opening extending transversely through said first linkage member and said first linkage member having spaced, parallel wall portions on opposite sides of said slotlike opening, said nut having axially extending grooves on opposite sides thereof which each slidably receive a respective one of said wall portions, said wall portions preventing rotation of said nut relative to said first linkage member about an axis parallel to said direction of relative movement.

13. The valve of claim 12, wherein said nut has an axial length which is less than the distance between said parallel wall portions, and has at one end of each said groove a bevel, said bevels being located adjacent opposite axial ends of said nut, said bevels and said grooves facilitating pivotal movement of said nut, when said nut is disengaged from said threaded rod, by approximately 90° relative to said first linkage member about a pivot axis substantially perpendicular to said direction of relative movement to an angular position in which an axis of said nut is substantially perpendicular to said wall portions and in which said nut is free to move parallel to said pivot axis to facilitate removal of said nut from said slotlike opening.

14. The valve of claim 13, wherein said movement of said actuating part is pivotal movement about a first axis, said first linkage member having an end remote from said end surface thereon which is pivotally coupled to said actuating part at a location spaced from said first axis; including a support arm supported on said housing for pivotal movement about a second axis spaced from and substantially parallel to said first axis, said second linkage member having an end remote from said rod thereon which is pivotally coupled to said support arm at a location spaced radially from said second axis, said valve member being pivotally supported on said support arm at a location spaced radially from said second axis.

* * * * *